(12) United States Patent
Zhao et al.

(10) Patent No.: US 9,705,964 B2
(45) Date of Patent: Jul. 11, 2017

(54) RENDERING MULTIPLE REMOTE GRAPHICS APPLICATIONS

(71) Applicant: Intel Corporation, Santa Clara, CA (US)

(72) Inventors: Chengming Zhao, Shanghai (CN); Tao Zhao, Shanghai (CN); John C. Weast, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 13/899,935

(22) Filed: May 22, 2013

(65) Prior Publication Data

US 2013/0325930 A1    Dec. 5, 2013

(51) Int. Cl.
*H04L 29/08*    (2006.01)
*H04L 29/06*    (2006.01)

(52) U.S. Cl.
CPC .............. *H04L 67/10* (2013.01); *H04L 67/04* (2013.01); *H04L 67/2828* (2013.01); *H04L 67/38* (2013.01)

(58) Field of Classification Search
CPC ..... H04L 67/04; H04L 67/10; H04L 67/2828; H04L 67/38
USPC ........................................................ 709/203
See application file for complete search history.

(56) References Cited

U.S. PATENT DOCUMENTS

| | | | | |
|---|---|---|---|---|
| 6,343,313 B1 * | 1/2002 | Salesky | ................. | G06F 3/1415 709/203 |
| 6,345,279 B1 * | 2/2002 | Li | .................... | G06F 17/30905 |
| 7,587,669 B2 * | 9/2009 | Rana | ................. | G06F 17/30905 709/247 |
| 7,716,453 B2 * | 5/2010 | Anschel | ............. | G06F 12/1036 711/159 |
| 7,864,203 B1 * | 1/2011 | Fear | ....................... | G09G 5/003 345/428 |
| 7,958,185 B2 * | 6/2011 | Rothermel | ............. | G06F 17/50 709/203 |
| 7,991,837 B1 * | 8/2011 | Tahan | ................... | G06F 3/0481 348/240.3 |
| 8,180,826 B2 * | 5/2012 | Hua | ................. | G06F 17/30793 709/201 |

(Continued)

FOREIGN PATENT DOCUMENTS

| BE | EP 2098995 A2 * | 9/2009 | ........... G06T 15/005 |
|---|---|---|---|
| EP | 2098995 | 9/2009 | |

(Continued)

OTHER PUBLICATIONS

PCT International Search Report and Written Opinion issued in corresponding PCT/US2012/040329 dated Jun. 28, 2013, (11 pages).

(Continued)

*Primary Examiner* — Arvin Eskandarnia
(74) *Attorney, Agent, or Firm* — Trop Pruner & Hu, P.C.

(57) ABSTRACT

In some embodiments, remote graphics rendering may be facilitated by causing thin clients, that send raw graphics data to a local server for rendering, to downscale the data to a size appropriate for use by the local server. In some embodiments this avoids the storage of unnecessary data which is not useful for the local server because the actual display size on the local server is smaller than what the transmitted raw data would permit.

16 Claims, 4 Drawing Sheets

(56) References Cited

U.S. PATENT DOCUMENTS

| | | | |
|---|---|---|---|
| 8,472,754 B1* | 6/2013 | Harkness | H04N 19/86 358/1.2 |
| 8,907,987 B2 | 12/2014 | Chowdhry et al. | |
| 8,941,668 B2* | 1/2015 | Diamond | G06F 3/14 345/501 |
| 8,948,496 B2* | 2/2015 | Huffman | G06F 19/321 382/154 |
| 8,949,316 B2* | 2/2015 | Lauwers | G06F 3/16 370/260 |
| 2002/0150048 A1* | 10/2002 | Ha | H04L 1/1887 370/231 |
| 2003/0120747 A1* | 6/2003 | Kim | H04L 69/04 709/217 |
| 2003/0140245 A1* | 7/2003 | Dahan | G06F 9/30047 713/190 |
| 2003/0196211 A1* | 10/2003 | Chan | H04N 21/23436 725/131 |
| 2004/0240752 A1 | 12/2004 | Dobbs | |
| 2005/0175258 A1* | 8/2005 | Leung | G06T 3/4023 382/299 |
| 2007/0265031 A1* | 11/2007 | Koizumi | H04M 1/0225 455/556.1 |
| 2008/0120539 A1* | 5/2008 | Stephens, Jr. | G06F 17/24 715/256 |
| 2009/0128572 A1 | 5/2009 | MacInnis | |
| 2011/0173247 A1* | 7/2011 | Hubbard | G06Q 30/02 709/203 |
| 2012/0011568 A1* | 1/2012 | Tahan | G06F 3/0481 726/4 |
| 2012/0098864 A1* | 4/2012 | Chowdhry | G09G 5/14 345/660 |
| 2013/0127852 A1* | 5/2013 | Menkov | G01C 21/20 345/420 |
| 2013/0147819 A1* | 6/2013 | Dharmapurikar | H04N 19/27 345/522 |
| 2014/0139537 A1* | 5/2014 | Ghosh | G06F 3/14 345/547 |
| 2016/0037160 A1* | 2/2016 | Hori | H04N 19/147 375/240.25 |

FOREIGN PATENT DOCUMENTS

| | | | |
|---|---|---|---|
| EP | 2098995 A2 * | 9/2009 | G06T 15/08 |
| EP | 2098995 A2 | 9/2009 | |
| KR | 10-2002-0034347 | 5/2002 | |
| KR | 10-2003-0061559 | 7/2003 | |
| KR | 1020030061559 | 7/2003 | |
| TW | 480891 | 3/2002 | |
| TW | 200630828 | 9/2006 | |
| TW | 200836077 | 9/2008 | |
| TW | I313433 | 8/2009 | |

OTHER PUBLICATIONS

Taiwan office action issued by Taiwan Intellectual Property Office in corresponding 102118952 dated Oct. 22, 2014. [w/English translation] (10 pages).

Taiwan search report issued by Taiwan Intellectual Property Office in corresponding 102118952 dated Oct. 5, 2014. [w/English translation] (2 pages).

Search Report and Written Opinion issued in corresponding PCT/US2012/040329 dated Jun. 28, 2013 (11 pages).

TW office action and search report issued in corresponding TW application No. TW 104116039 dated Sep. 12, 2016 (14 pages).

CN office action in corresponding CN patent application No. 201280072811.1 dated Apr. 5, 2016 (7 pages) [no translation].

CN office action in corresponding CN patent application No. 201280072811.1 dated Nov. 2, 2016 (4 pages) [no translation].

TW divisional office action in corresponding TW patent application No. 104116039 dated Jan. 11, 2017 (12 pages).

TW divisional search report in corresponding TW patent application No. 104116039 dated Jan. 3, 2017 (3 pages).

TW divisional office action in corresponding TW patent application No. 104116039 dated Sep. 12, 2016 (12 pages).

TW divisional search report in corresponding TW patent application No. 104116039 dated Sep. 26, 2016 (2 pages).

* cited by examiner

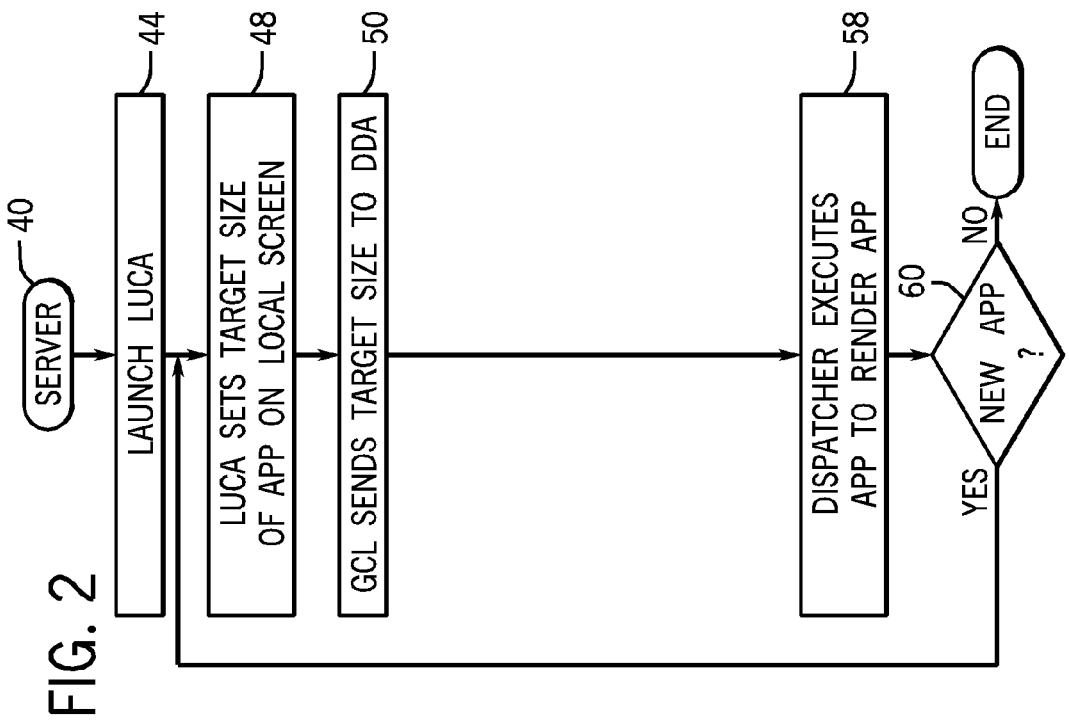

RENDERING MULTIPLE REMOTE GRAPHICS APPLICATIONS

CROSS-REFERENCE TO RELATED APPLICATION

This application claims priority to PCT/US2012/040329, filed May 31, 2012.

BACKGROUND

This relates generally to rendering graphics applications.

Generally when graphics applications render content, from a thin client, on a remote server, the server is charged with all tasks related to rendering the graphics for the client. Thus, commonly, the client may send graphics to be rendered to the server. Particularly, the client may send raw RGB data and coordination to the server.

However, the data that the client sends to the server may be unnecessarily consumptive of graphics memory. One reason for this is that the data that is sent is not appropriately scaled for use by the server. Thus the server may spend resources storing graphics data scaled in a way that much of the stored data will never be used anyway. This is particularly so when the actual display size on the server is smaller than that enabled by the data sent from the client.

BRIEF DESCRIPTION OF THE DRAWINGS

Some embodiments are described with respect to the following figures:

FIG. 2 is a flow chart for a sequence implemented on a server according to one embodiment of the present invention;

FIG. 3 is a flow chart for a sequence implemented on a client according to one embodiment;

DETAILED DESCRIPTION

In some embodiments, remote graphics rendering may be facilitated by causing thin clients, that send raw graphics data to a local server for rendering, to downscale the data to a size appropriate for use by the local server. In some embodiments this avoids the storage of unnecessary data that is not useful for the local server because the actual display size on the local server is smaller than what the transmitted raw data would permit.

In some embodiments this downscaling may be accomplished by causing the local server to notify the remote thin client to downscale the data. Then the data that is sent may align with the actual size displaying on the local server.

In one embodiment, an agent may be implanted by the server in the graphics library of the client to downscale the raw color space (such as RGB data) and coordination in the application program interface (API) calls before sending the commands to the server for rendering. When rendering the multiple applications, the server may require each agent and each client to downscale the data to align to the display size on the screen. This may save both graphics memory and graphics processing unit workload on the server in some embodiments.

Figure 1:
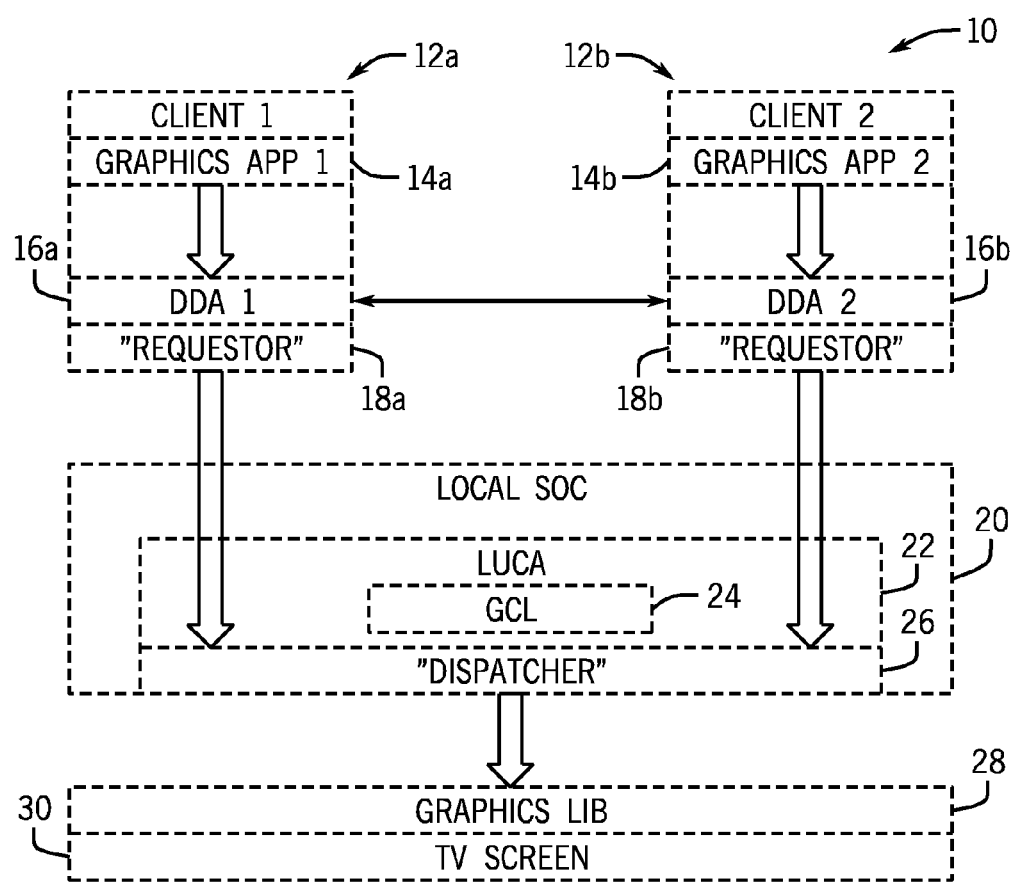
FIG. 1 is a schematic depiction for one embodiment with two thin clients in communication with a server coupled to a television screen according to one embodiment.

Thus, referring to FIG. 1, in a system 10, two thin clients 12a and 12b may send color space data, such as raw RGB data, to a local server 20 to render on a display screen 30 in some embodiments. Other embodiments may involve different numbers of thin clients.

Each client may include a graphics application 14a or 14b and a data downscaling agent 16a and 16b. Each data downscaling agent may be implanted on each client by the local server 20 in one embodiment. In other embodiments, a variety of data downscaling agents may be provided in each client and the data downscaling agent appropriate for a given local server may be selected by a message from the local server. And still another example, the data downscaling agent may be downloaded from another server, website or database as specified by the server.

Each client also includes a graphics rendering requestor 18a or 18b that communicates with a dispatcher 26 on the local server 20.

In some embodiments, the local server may be a system on a chip (SOC) but other embodiments are also contemplated. The local server 20 may include a local user interface composing application (LUCA) 22 which includes a graphics composing listener (GCL) 24 in one embodiment.

The dispatcher in the server 20 communicates with the graphics library 28 associated with the television display screen 30. Other display screens may also be used.

The data downscaling agent 16a or 16b intercepts API calls in the thin client and sends the commands to the local server for rendering. The graphics composing listener monitors for the graphics API call from the local user interface composing application when that application composes the remote application to the local screen 30. If the composing application is trying to resize a remote application for user interface composing, the graphics composing layer intercepts it and sends the target size to the data downscaling agent.

The agent downscales all the related parameters of the graphics API call in the thin client to align with the new target size and to save that information in the client for reuse. The composing application only needs to allocate memory sufficient to store the downscaled application surface since downscaling has already been done in advance of transfer to the server by the thin client. This may reduce the memory used in graphics processing workload for rendering in the composing application.

The data downscaling agent may reside between a graphics API library (not shown) and the requestor. The requestor may be used on the client to send graphics API commands to the dispatcher on the server. The dispatcher parses the commands and calls the graphics library 28 for rendering.

When the data downscaling agent receives a target size from the graphics composing layer, the data downscaling agent compares the new size. If any resizing is called for, the data downscaling agent downscales the data to the new size. Then the agent passes down the downscaled data to the requestor to send it to the remote server in API command.

For example in DirectFB, the CreateSurface requires a size of the surface. The data downscaling agent intercepts this API and changes the size to allow to the target size before the requestor sends the API command to the graphics composing layer. Another API example is lock. This function is used to write raw RGB data into the surface. The agent intercepts this API and applies downscaling on the raw data before it is sent out in graphics commands.

Then the data downscaling agent saves the new target size and the downscaled data in the local client. As a result, the agent can reuse the downscaled data in some embodiments.

The graphics composing listener may run in the same process as the composing application 22. It may execute graphic API calls from remote applications over a network. When the composing application is trying to compose a remote application, the composing listener intercepts the size and position-related graphics API calls to get the actual size of the application that is expected to display on the local screen 30. Instead of doing resizing itself, the composing listener sends the target size to the data downscaling agent on the thin client. The data downscaling agent changes the input parameters including position and size and downscales the image data in the API call to align to the expected size so that the composing agent can compose it directly.

Referring to FIG. 2, a flow chart for a sequence 40 implemented on the server 20 may use software, firmware, and/or hardware to implement the sequence. In software and firmware embodiments, the sequence may be implemented by computer executed instructions stored in one or more non-transitory computer readable media such as magnetic, semiconductor or optical storage media.

Referring to FIG. 3, a flow chart for a sequence 42 implemented on a client 12 may use software, firmware, and/or hardware to implement the sequence. In software and firmware embodiments, the sequence may be implemented by computer executed instructions stored in one or more non-transitory computer readable media such as magnetic, semiconductor or optical storage media.

The sequence 40 FIG. 2 begins by launching the composing application as indicated in block 44. Then the graphics application launches on one of the clients as indicated in block 46 in FIG. 3. Next the composing application sets the target size of the first client's application on the local screen as indicated in block 48 in FIG. 2. Thereafter, the composing listener sends the target size to the agent 16, as included in block 50 in FIG. 2. The data downscaling agent 16a downscales the image data to align to the display size as indicated in block 52 in FIG. 3.

In a DirectFB example, when IDFBSurface::Lock writes raw data into a surface, width and height are also required. The data downscaling agent intercepts this API and downscales the raw data to align to the target size before sending an API command to the graphics composing layer. In addition the width and the height of this API are also changed to fit the target size of the local screen.

Then as indicated in block 54 (FIG. 3) the data downscaling agent passes down the downscaled data to the requestor within the thin client. The requestor sends API calls to the dispatcher within the server (FIG. 3, block 56). The dispatcher executes the API to render the application to the screen 30 as indicated in block 58 of FIG. 2. Then another application launches as indicated in diamond 60 (FIG. 2) and the flows repeat.

Figure 4:
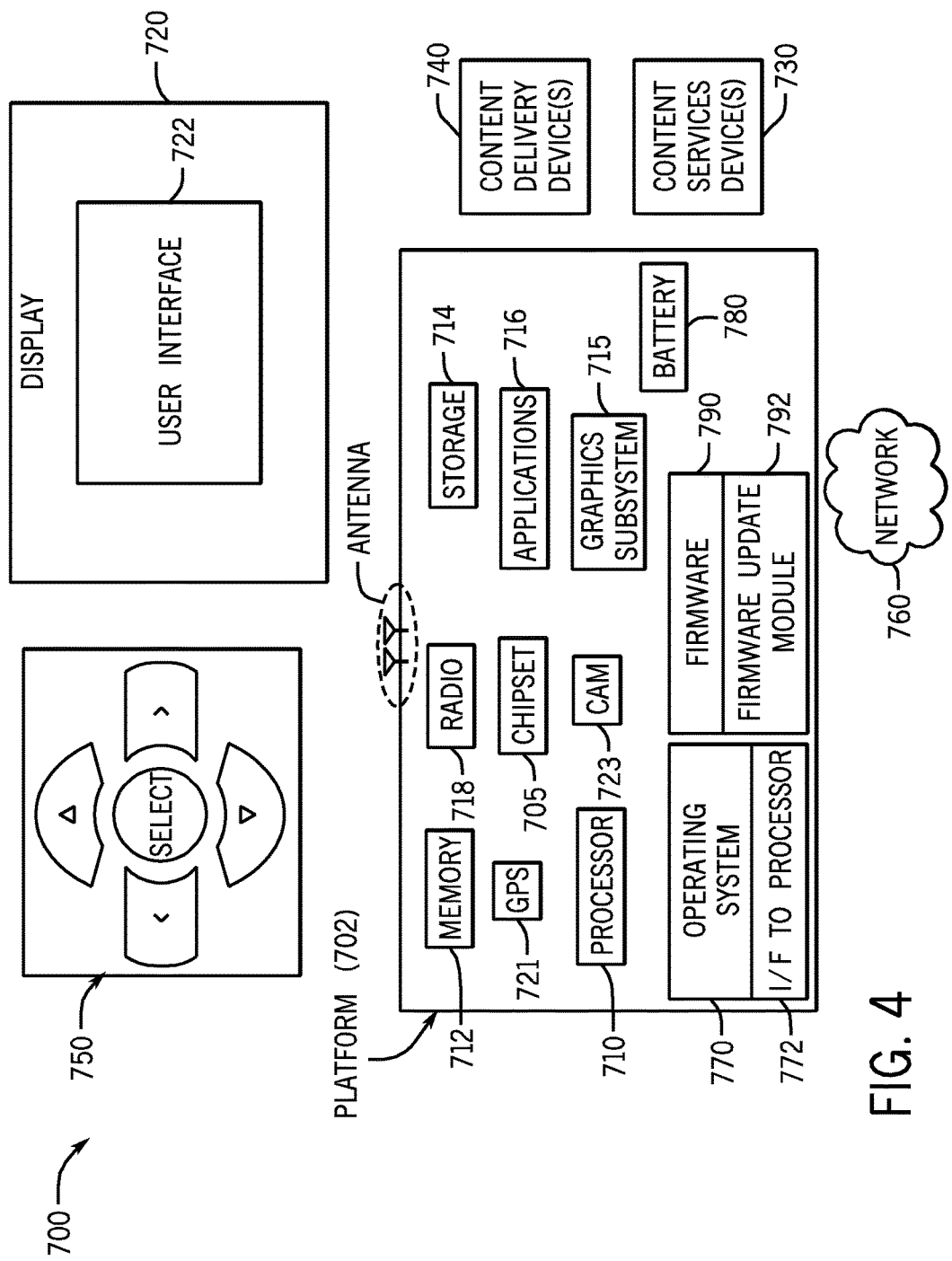
FIG. 4 is a system depiction for one embodiment.

FIG. 4 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716, global positioning system (GPS) 721, camera 723 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

In addition, the platform 702 may include an operating system 770. An interface to the processor 772 may interface the operating system and the processor 710.

Firmware 790 may be provided to implement functions such as the boot sequence. An update module to enable the firmware to be updated from outside the platform 702 may be provided. For example the update module may include code to determine whether the attempt to update is authentic and to identify the latest update of the firmware 790 to facilitate the determination of when updates are needed.

In some embodiments, the platform 702 may be powered by an external power supply. In some cases, the platform 702 may also include an internal battery 780 which acts as a power source in embodiments that do not adapt to external power supply or in embodiments that allow either battery sourced power or external sourced power.

The sequences shown in FIGS. 2 and 3 may be implemented in software and firmware embodiments by incorporating them within the storage 714 or within memory within the processor 710 or the graphics subsystem 715 to mention a few examples. The graphics subsystem 715 may include the graphics processing unit and the processor 710 may be a central processing unit in one embodiment.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 5:
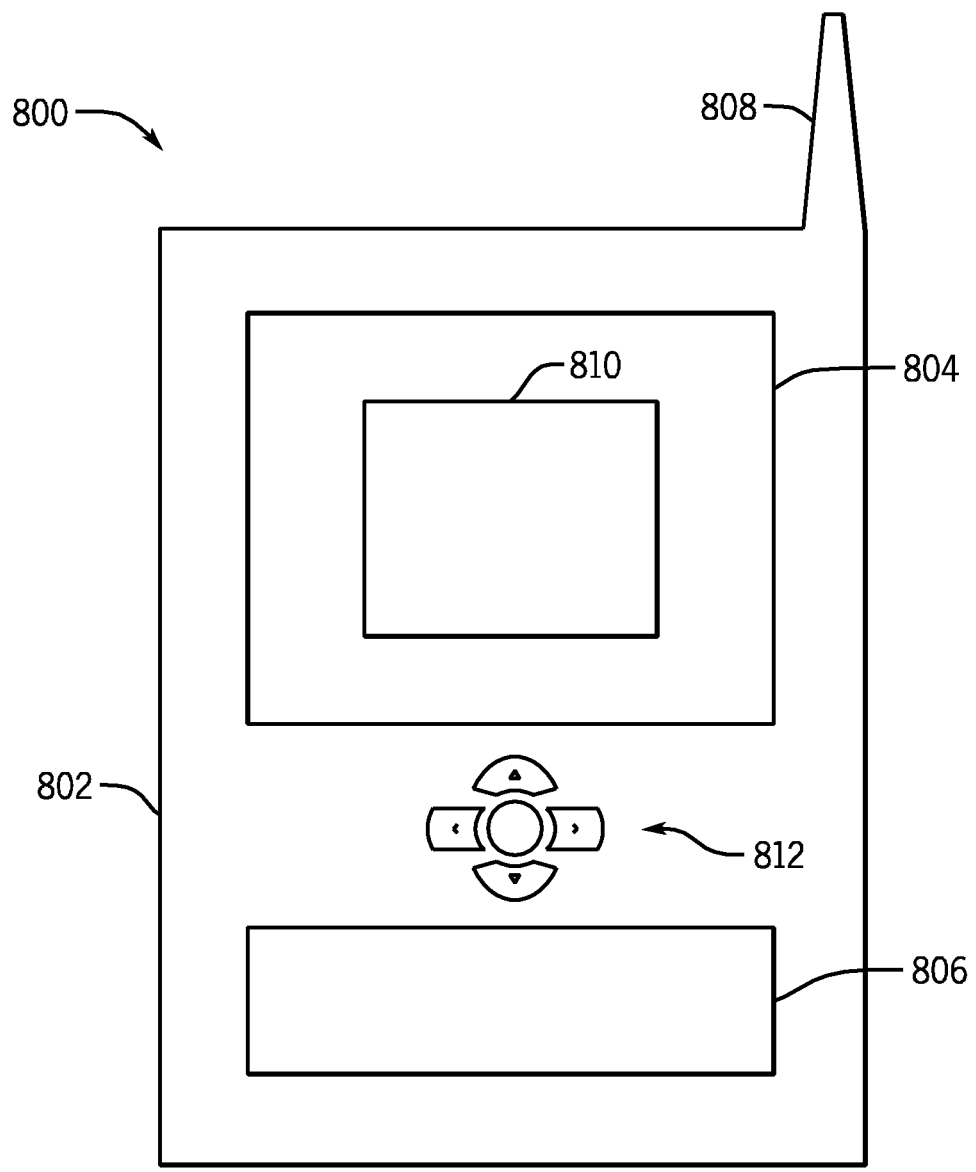
FIG. 5 is a front elevational view of one embodiment.

As shown in FIG. 5, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

The following clauses and/or examples pertain to further embodiments:

One example embodiment may be a method comprising commanding, by a server a thin client to scale graphics data sent for rendering on the server. The method may also include commanding the thin client to downscale the graphics data. The method may also include providing a height and width for video data from the client. The method may also include inserting an agent on said client to downscale said data. The method may also include inserting an agent to intercept application program interface calls on said client. The method may also include inserting an agent to intercept a local user interface composing application call to resize a remote application. The method may also include receiving, in said agent, a target size from a graphics composing layer. The method may also include enabling the agent to store and reuse said target size. The method may also include at least one machine readable medium comprising a plurality of instructions and, in response to being executed on a computing device, causing the computing device to carry out a method.

At least one machine readable medium comprises a plurality of instructions and, in response to being executed on a computing device, causing the computing device to carry out the methods set forth in the proceeding paragraph.

One example embodiment may be an apparatus comprising a server to command a thin client to scale graphics data sent for rendering on said server; and a memory coupled to said server. Said server to command the thin client to downscale the graphics data. Said server to provide a height and width for video data from the client. Said server to insert an agent on said client to downscale said data. Said server to insert an agent to intercept application program interface calls on said client. Said server to insert an agent to intercept a local user interface composing application call to resize a remote application. The apparatus may include an operating system, a battery, firmware and a module to update said firmware.

Another example embodiment may be a thin client comprising an agent to scale graphics data for rendering on a server; and a requestor coupled to said agent. The client to downscale the graphics data. The agent may receive a target size from a graphics composing layer. The client may store and reuse said target size.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
  commanding, by a server, a thin client to downscale graphics data and to send the graphics data for rendering on the server;
  providing a height and width for graphics data from the client;
  rendering the scaled graphics data on the server;
  displaying the graphics data on the server; and
  inserting an agent on said client to downscale said graphics data.

2. The method of claim 1 including inserting an agent to intercept application program interface calls on said client.

3. The method of claim 2 including inserting an agent to intercept a local user interface composing application call to resize a remote application.

4. The method of claim 1 including receiving, in said agent, a target size from a graphics composing layer.

5. The method of claim 4 including enabling the agent to store and reuse said target size.

6. At least one non-transitory machine readable medium comprising a plurality of instructions and, in response to being executed on a computing device, causing the computing device to carry out a sequence comprising:
  commanding, by a server, a thin client to downscale graphics data and to send the graphics data for rendering on the server;
  providing a height and width for graphics data from the client;
  rendering the scaled graphics data on the server;
  displaying the graphics data on the server; and
  inserting an agent on said client to downscale said graphics data.

7. The medium of claim 6, said sequence including inserting an agent to intercept application program interface calls on said client.

8. The medium of claim 7, said sequence including inserting an agent to intercept a local user interface composing application call to resize a remote application.

9. The medium of claim 6, said sequence including receiving, in said agent, a target size from a graphics composing layer.

10. The medium of claim 9, said sequence including enabling the agent to store and reuse said target size.

11. An apparatus comprising:
  a server to command a thin client to downscale graphics data and to send the graphics data for rendering on said server, to provide a height and width for graphics data from the client, to insert an agent on said client to downscale said graphics data, to render the scaled graphics data on the server and display the graphics data on the server; and
  a memory coupled to said server.

12. The apparatus of claim 11, said server to insert an agent to intercept application program interface calls on said client.

13. The apparatus of claim 12, said server to insert an agent to intercept a local user interface composing application call to resize a remote application.

14. The apparatus of claim 11 including an operating system.

15. The apparatus of claim 11 including a battery.

16. The apparatus of claim 11 including firmware and a module to update said firmware.

\* \* \* \* \*